(12) United States Patent
Huang (10) Patent No.: US 12,179,650 B2
(45) Date of Patent: Dec. 31, 2024

(54) IN-VEHICLE CUP HOLDER AND COMBINED IN-VEHICLE IMPLEMENT CONTAINING SAME

(71) Applicant: Tao Huang, Ningbo (CN)

(72) Inventor: Tao Huang, Ningbo (CN)

( * ) Notice: Subject to any disclaimer, the term of this patent is extended or adjusted under 35 U.S.C. 154(b) by 325 days.

(21) Appl. No.: 17/829,386

(22) Filed: Jun. 1, 2022

(65) Prior Publication Data

US 2022/0289092 A1 Sep. 15, 2022

(30) Foreign Application Priority Data

Feb. 21, 2022 (CN) .......................... 202210158228.8

(51) Int. Cl.
*B60N 3/10* (2006.01)
(52) U.S. Cl.
CPC .................................... *B60N 3/101* (2013.01)
(58) Field of Classification Search
CPC ........ B60N 3/101; B60N 3/102; B60N 3/103; B60N 3/105; B60N 3/106; B60N 3/108
USPC ........................................................ 224/548
See application file for complete search history.

(56) References Cited

U.S. PATENT DOCUMENTS

| | | | | |
|---|---|---|---|---|
| 6,113,049 A | * | 9/2000 | Miljanich | B60N 3/103 |
| | | | | 248/314 |
| 11,254,253 B1 | * | 2/2022 | Fan | B60N 3/106 |
| 2005/0224676 A1 | | 10/2005 | Stavermann | |
| 2006/0150654 A1 | | 7/2006 | Arold | |
| 2006/0237499 A1 | | 10/2006 | Teichrieb | |

FOREIGN PATENT DOCUMENTS

| | | | |
|---|---|---|---|
| CN | 214607233 U | * 11/2021 | |
| WO | WO-9617542 A1 | * 6/1996 | B60N 3/101 |

OTHER PUBLICATIONS

CN-214607233-U Translation, Yang W, Nov. 5, 2021 (Year: 2021).*

* cited by examiner

*Primary Examiner* — Nathan J Newhouse
*Assistant Examiner* — Matthew T. Theis (57) ABSTRACT

The present disclosure provides an in-vehicle cup holder and a combined in-vehicle implement including the in-vehicle cup holder. The in-vehicle cup holder includes: a cup holder housing, the cup holder housing being provided therein successively from bottom to top a cup holder foot support and a knob member; wherein the cup holder foot support is distracted and retracted under an effect of the knob member; and the knob member includes a knob lower case, a knob upper case disposed on the knob lower case, a knob cover plate, and a knob mechanism, wherein the knob mechanism is mounted on the knob upper case, and the knob cover plate is mounted on an inner side wall of the cup holder housing and is in contact with the knob mechanism.

7 Claims, 14 Drawing Sheets

IN-VEHICLE CUP HOLDER AND COMBINED IN-VEHICLE IMPLEMENT CONTAINING SAME

TECHNICAL FIELD

The present disclosure relates to the technical field of in-vehicle articles, and in particular, relates to an in-vehicle cup holder and a combined in-vehicle implement containing the same.

BACKGROUND

Automobiles are essential means of transportation in life. Although developments of automobile engines are not dramatic in recent years, with developments of automobiles, various accessories are emerging to better meet people's needs. For better accommodation of people's requirements for comfort and practicality, the automobiles are usually equipped with cup holders for drivers to place the cups. In-vehicle trays are also common Basically, each automobile is equipped with an in-vehicle cup holder to satisfy water drinking needs of passengers and driver. For a high use efficiency of the in-vehicle cup holder, the cup holder and the tray may be fixed to the position of the cup.

However, regarding the conventional cup holder, during mounting, an orientation of the cup holder may not be controlled, and thus it is inconvenient for the passenger to grasp the handle of the cup. In addition, the cup holder may be subject to looseness after long-time use, and the cup holder needs to be periodically fastened, which is not convenient.

SUMMARY

In view of the defects in the related art, the present disclosure is intended to provide an in-vehicle cup holder, and a combined in-vehicle implement including the in-vehicle cup holder. According to the present disclosure, an orientation of the cup holder is accurately controlled, and a rotation mechanism of the cup holder is not subject to looseness, and is durable.

To achieve the above objective, the present disclosure employs the following technical solutions:

An in-vehicle cup holder includes: a cup holder housing, the cup holder housing being provided therein successively from bottom to top a cup holder foot support and a knob member; wherein the cup holder foot support is distracted and retracted under an effect of the knob member; and the knob member includes a knob lower case, a knob upper case disposed on the knob lower case, a knob cover plate, and a knob mechanism, wherein the knob mechanism is mounted on the knob upper case, and the knob cover plate is mounted on an inner side wall of the cup holder housing and is in contact with the knob mechanism.

In an optional technical solution according to the present disclosure, the cup holder housing is a hollow cylinder, and is composed of a first housing section, a second housing section, and a third housing section that become progressively larger.

In an optional technical solution according to the present disclosure, the cup holder foot support is disposed inside the first housing section, the first housing section is provided with a cavity structure allowing distraction and retraction of the cup holder foot support, and the knob member is disposed inside the second housing section.

In an optional technical solution according to the present disclosure, a slide is disposed inside the first housing section, a slideway corresponding to the slide is disposed on each of both sides of the cup holder foot support, and an annularly distributed slot is disposed in an upper surface of the cup holder foot support.

In an optional technical solution according to the present disclosure, the knob upper case includes: a first screw hole, a first mounting slot, and a track, wherein the first screw hole is disposed in correspondence to a second screw hole on the knob lower case and is configured to connect the knob upper case to the knob lower case, and the knob mechanism is mounted in the first mounting slot.

In an optional technical solution according to the present disclosure, the knob lower case further includes: a rotation protrusion disposed on a lower surface of the knob lower case, wherein the number of the rotation protrusions is equal to the number of the cup holder foot supports, and the rotation protrusions acts on the slot on the cup holder foot support and is configured to control movement of the cup holder foot support.

In an optional technical solution according to the present disclosure, the knob cover plate includes: a first serration and a third screw hole, wherein the first serration is disposed on an inner side wall of the knob cover plate, and the third screw hole is disposed in correspondence to a fourth screw hole on the cup housing.

In an optional technical solution according to the present disclosure, the knob mechanism includes: a rotation button, a spring, a gear, a rack, a second serration, and a mounting cavity, wherein the gear is disposed in correspondence to the rack and disposed at a middle portion of the knob mechanism, the number of the rotation buttons is two and each of the two rotation buttons is disposed on one side of the gear, the spring is mounted inside the mounting cavity, one end of the spring is in contact with a fascia on the knob upper case, the other end of the spring is in contact with the mounting cavity, the second serration is disposed is disposed on each of two ends of the knob mechanism, the second serration is disposed in correspondence to the first serration, and the second serration is bi-directionally slidable on the track.

In an optional technical solution according to the present disclosure, a first rubber structure is disposed at an upper end portion of the cup holder housing, a second rubber structure is disposed on an outer side surface of the cup holder foot support, and a cup pad is disposed at an upper portion of the knob member inside the cup holder housing.

The present disclosure further provides a combined in-vehicle implement. The implement includes: the in-vehicle cup holder as described above, a secondary cup holder, and a tray, wherein the secondary cup holder is movably mounted on a side wall of in-vehicle the cup holder, and the tray is movably connected to the secondary cup holder.

Compared with the related art, the present disclosure achieves the following beneficial effects:

In the in-vehicle cup holder according to the present disclosure, by configuration of the first serration and the second serration, a rotation self-locking mechanism by a button inside the cup holder is achieved, it is more convenient for a user to determine a placement orientation of the cup holder, and additionally, the cup holder may be locked. In this way, the cup holder may not become loose under long-time extremely adverse conditions, such as bumps and high temperatures, and thus the in-vehicle cup holder according to the present disclosure is durable and economic.

Reference numerals and denotations thereof: 1—cup holder housing; 11—first housing section; 111—slide; 112—cavity structure; 12—second housing section; 13—third housing section; 14—fourth screw hole; 15—notch; 2—knob member; 21—knob upper case; 22—knob lower case; 23—knob cover plate; 24—knob mechanism; 211—first screw hole; 212—first mounting slot; 213—track; 214—fascia; 221—rotation protrusion; 222—second screw hole; 231—first serration; 232—third screw hole; 241—rotation button; 242—spring; 243—gear; 244—rack; 245—second serration; 246—mounting cavity; 3—cup holder foot support; 31—slideway; 32—slot; 4—cup pad; 5—first rubber structure; 6—second rubber structure; 7—secondary cup holder; and 8—tray.

DETAILED DESCRIPTION

For clearer descriptions of the objective, technical solutions, and advantages of the present disclosure, the present disclosure is further described with reference to the accompanying drawings.

Embodiment 1

Figure 1:
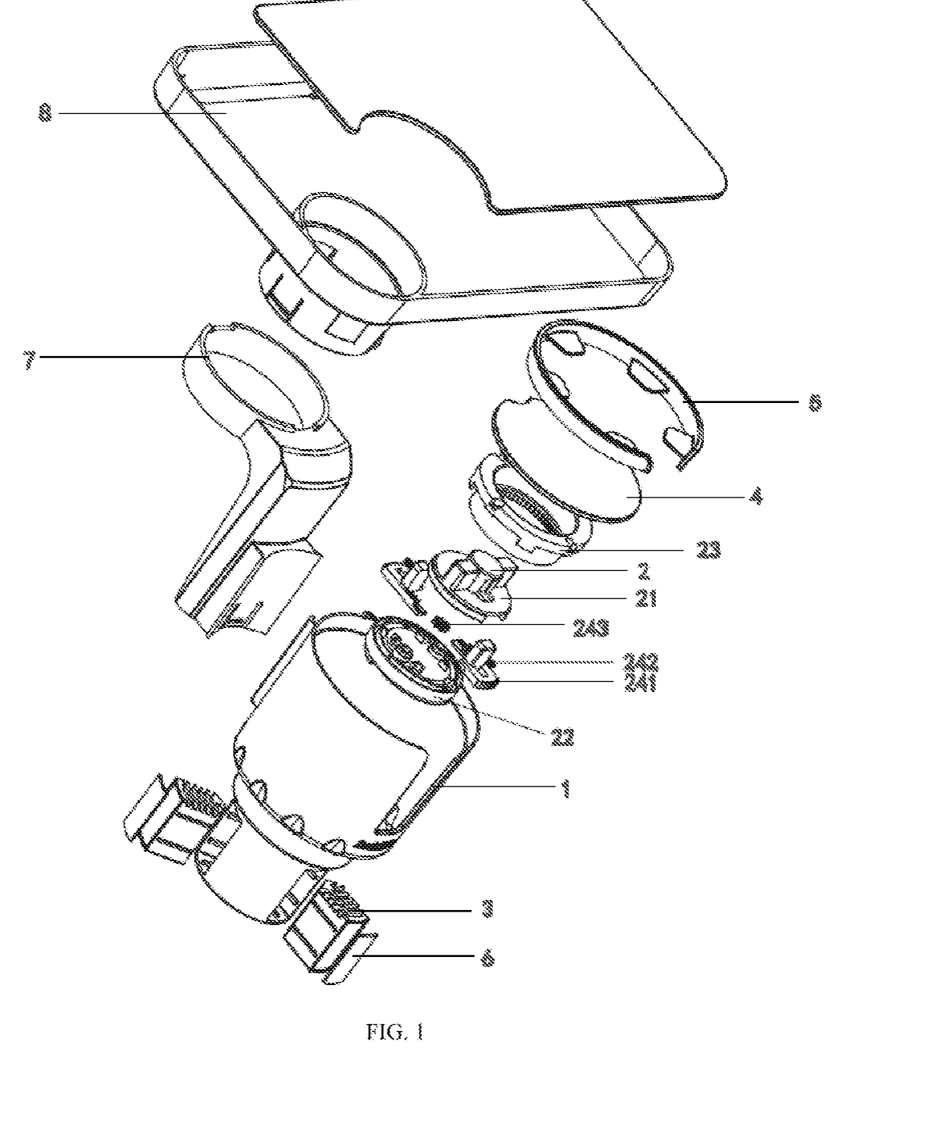
FIG. 1 is a schematic exploded structural view of a combined in-vehicle implement according to the present disclosure.
Figure 2:
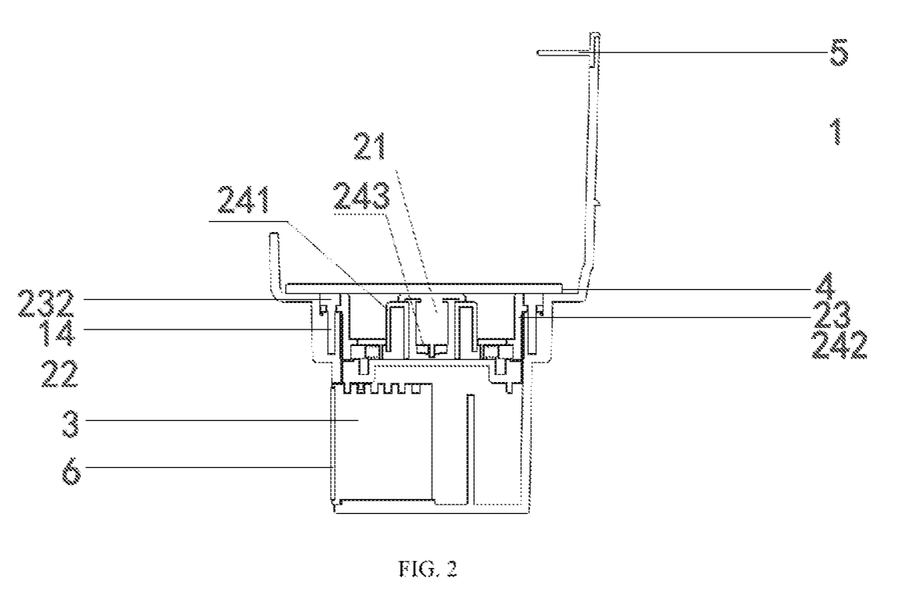
FIG. 2 is a schematic front perspective view of an in-vehicle cup holder according to the present disclosure.
Figure 3:
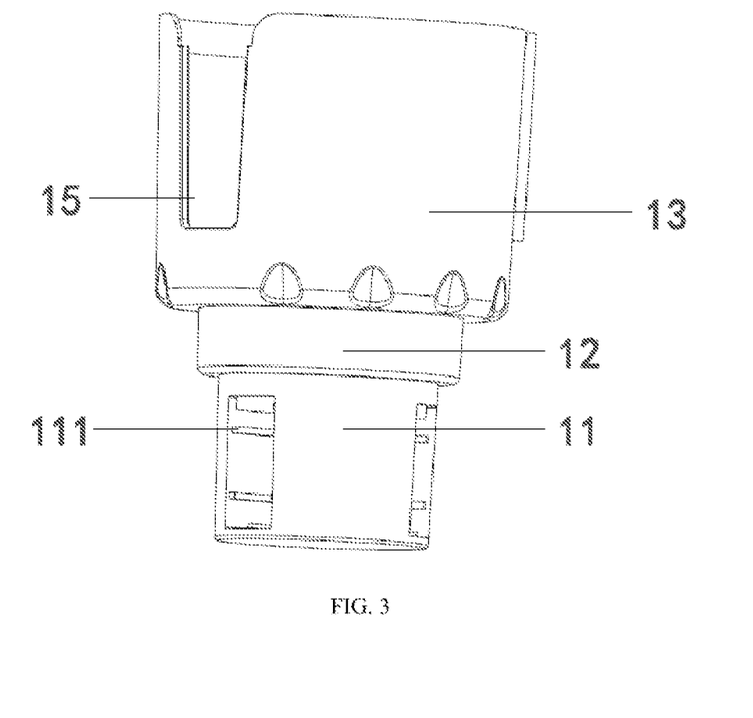
FIG. 3 is a schematic structural view of a cup holder housing according to the present disclosure.
Figure 4:
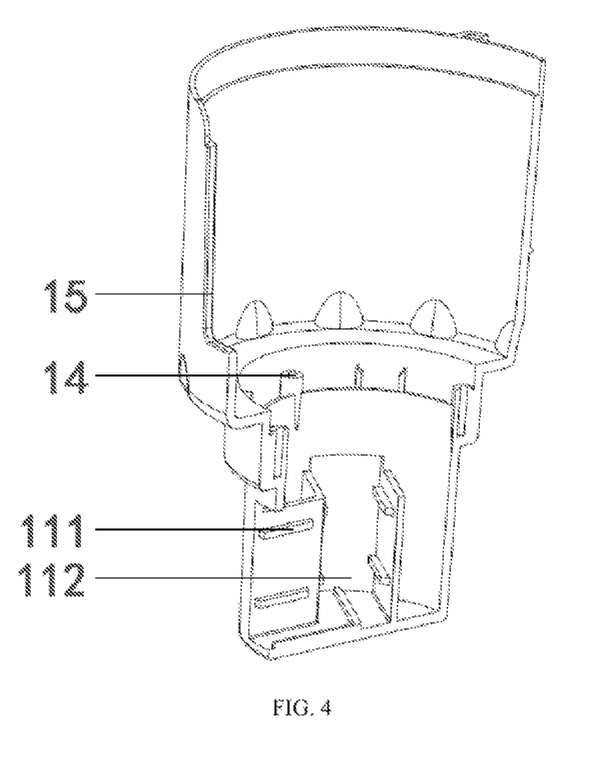
FIG. 4 is a schematic perspective view of the cup holder housing according to the present disclosure.
Figure 5:
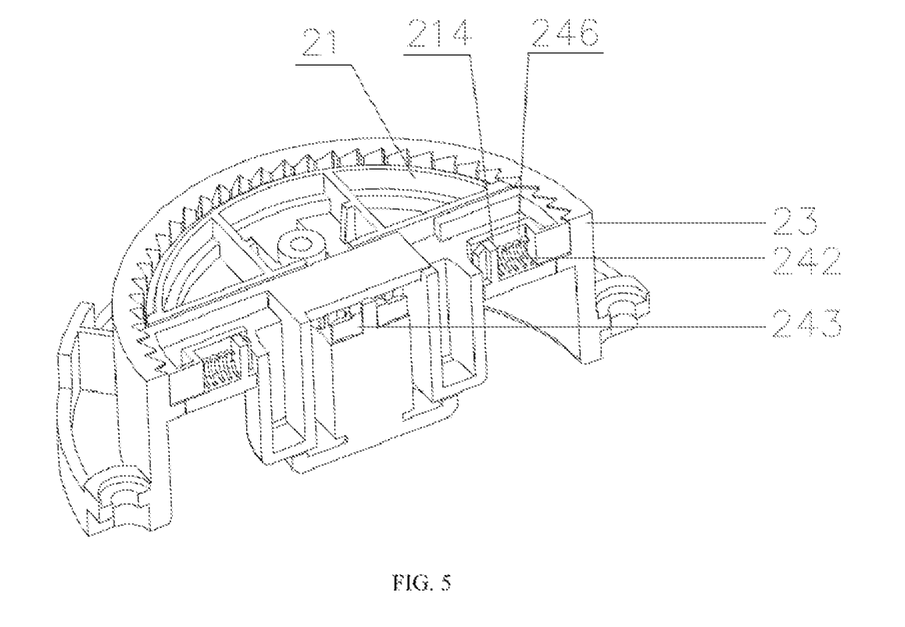
FIG. 5 is a schematic structural view of a combination of a knob mechanism and a knob cover plate according to the present disclosure.
Figure 6:
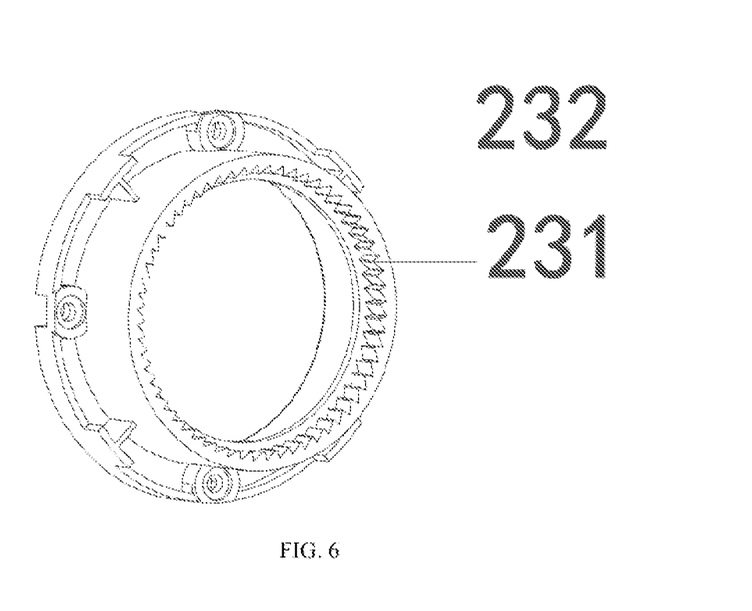
FIG. 6 is a schematic structural view of a knob cover plate according to the present disclosure.
Figure 7:
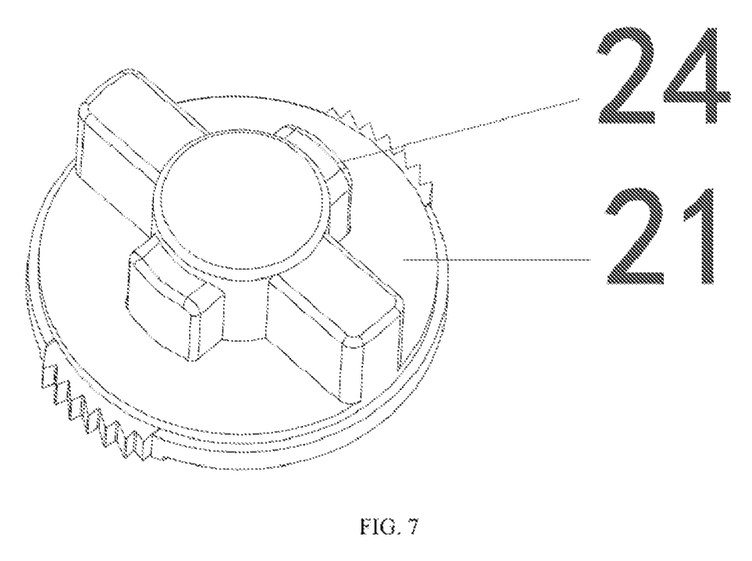
FIG. 7 is a schematic structural view of a combination of a knob upper case and a knob mechanism according to the present disclosure.
Figure 8:
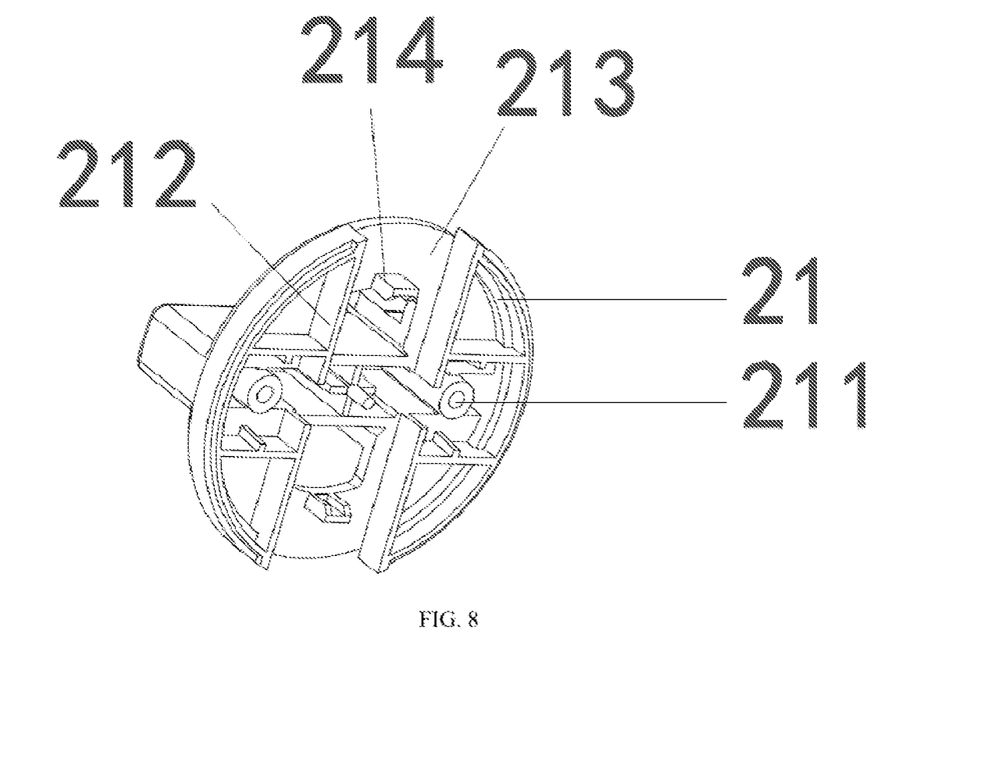
FIG. 8 is a schematic perspective view of the combination of the knob upper case and the knob mechanism according to the present disclosure.
Figure 9:
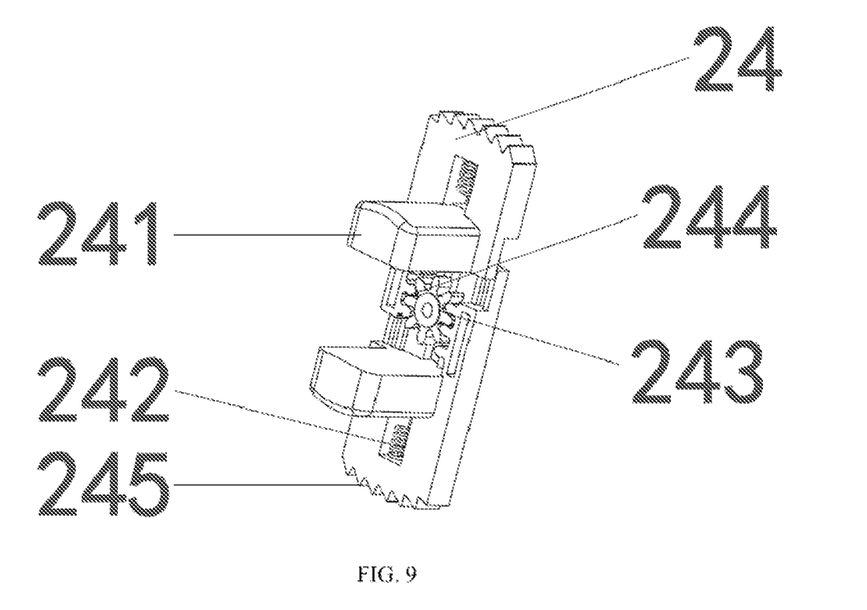
FIG. 9 is a schematic structural view of the knob mechanism according to the present disclosure.
Figure 10:
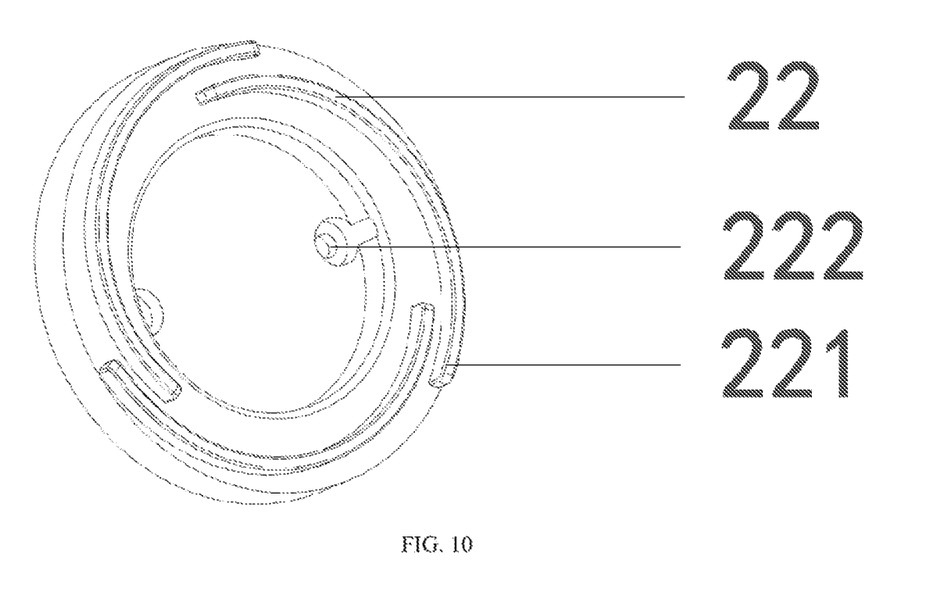
FIG. 10 is a schematic structural view of a knob lower case according to the present disclosure.
Figure 11:
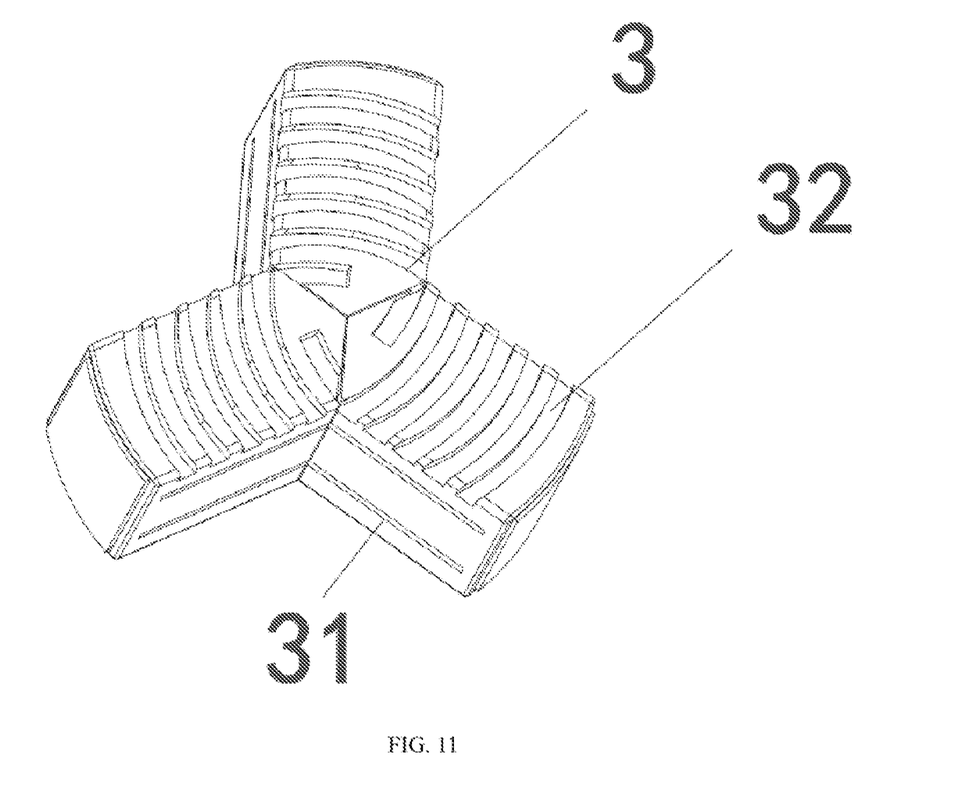
FIG. 11 is a schematic structural view of a cup holder foot support according to the present disclosure.
Figure 12:
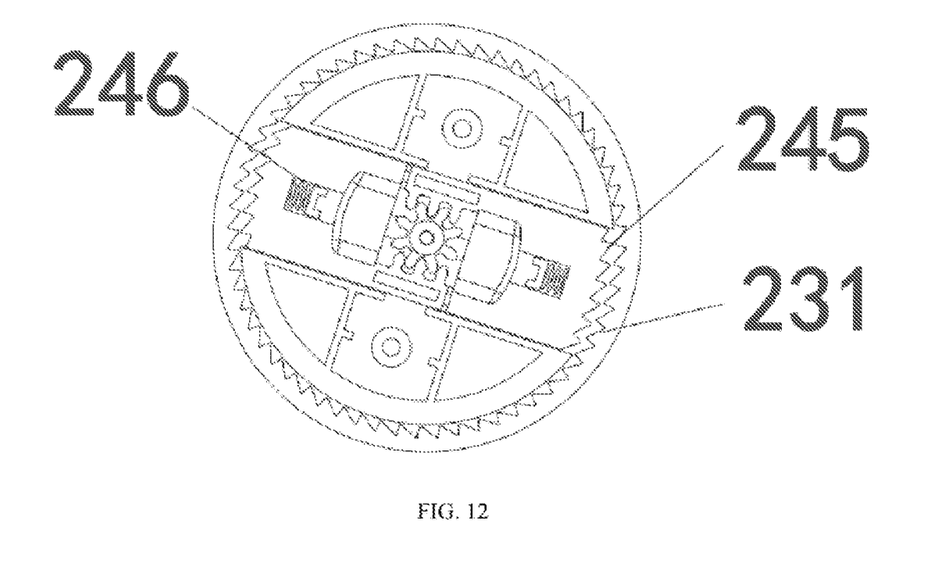
FIG. 12 is a schematic structural view of a first serration and a second serration according to the present invention.
Figure 13:
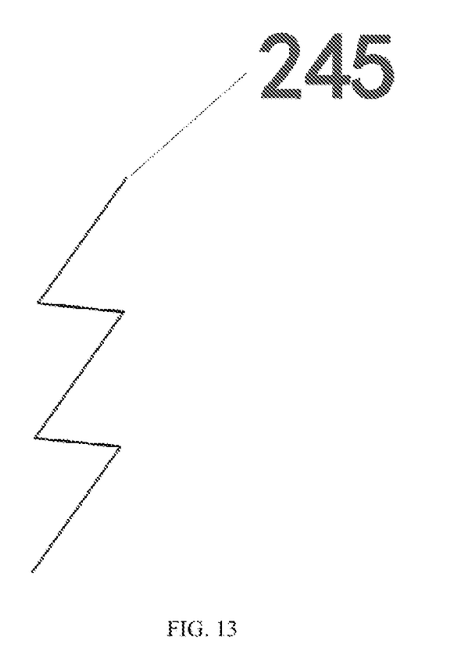
FIG. 13 is a schematic enlarged structural view of a serration structure according to the present disclosure.
Figure 14:
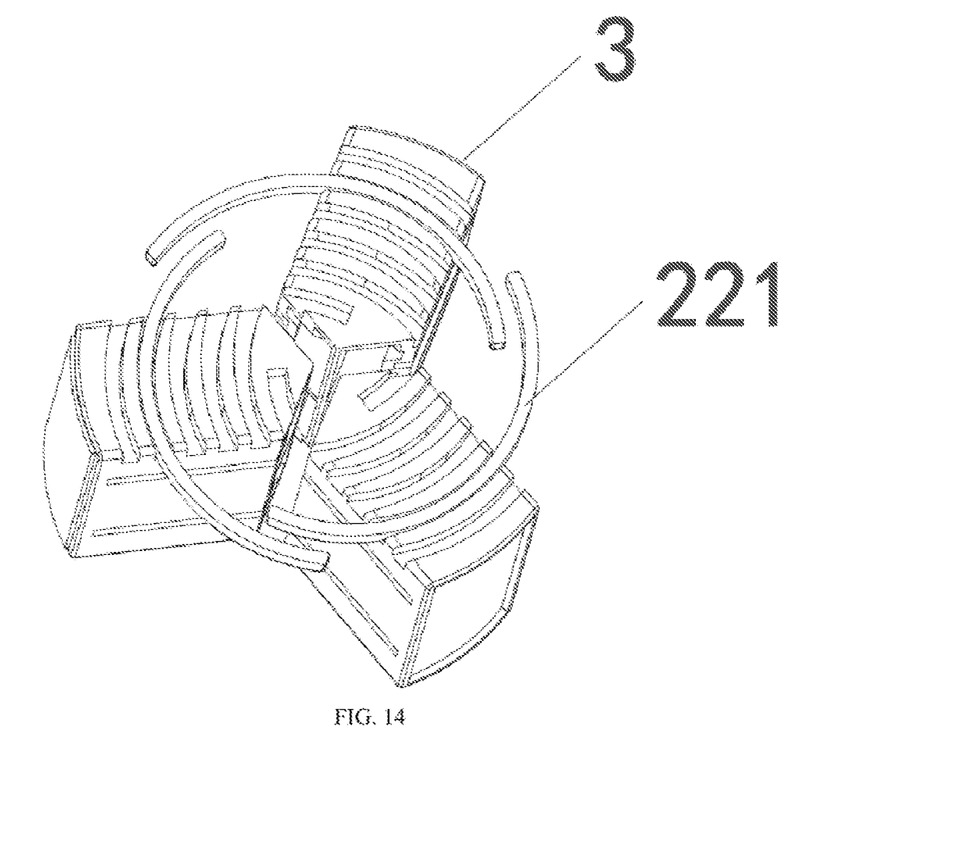
FIG. 14 is a schematic structural view of an effect between a rotation protrusion and the cup holder foot support according to the present disclosure.

As illustrated in FIG. 1 to FIG. 14, an in-vehicle cup holder includes: a cup holder housing 1, the cup holder housing 1 being provided therein successively from bottom to top a cup holder foot support 3 and a knob member 2, wherein the cup holder foot support 3 is distracted and retracted under an effect of the knob member 2; and the knob member 2 includes: a knob lower case 22, a knob upper case 21 disposed on the knob lower case 22, a knob cover plate 23, and a knob mechanism 24, wherein the knob mechanism 24 is mounted on the knob upper case 21, and the knob cover plate 23 is mounted on an inner side wall of the cup holder housing 1 and is in contact with the knob mechanism 24. It should be noted that the knob cover plate 23 being in contact with the knob mechanism 24 herein refers to contact and interaction between the first serration 231 and the second serration 245.

In an optional technical solution according to the embodiment of the present disclosure, a notch 15 is opened in one side of the cup holder housing 1, which allows the handle of a cup to go out.

In an optional technical solution according to this embodiment of the present disclosure, the cup holder housing 1 is a hollow cylinder, and is composed of a first housing section 11, a second housing section 12, and a third housing section 13 that become progressively larger.

In an optional technical solution according to the embodiment of the present disclosure, the cup holder foot support 3 is disposed inside the first housing section 11, the first housing section 11 is provided with a cavity structure 112 allowing distraction and retraction of the cup holder foot support 3, and the knob member 2 is disposed inside the second housing section 12.

In an optional technical solution according to the embodiment of the present disclosure, a slide 111 is disposed inside the first housing section 11, a slideway 31 corresponding to the slide 111 is disposed on each of both sides of the cup holder foot support 3, and an annularly distributed slot 32 is disposed in an upper surface of the cup holder foot support 3. It should be particularly noted that since the slot 32 has a quickly varying helix, a poor locking effect is achieved, and the cup holder foot support 3 may be retracted or distracted when a force is applied. Therefore, the structure herein only provides a track.

In an optional technical solution according to the embodiment of the present disclosure, the knob upper case 21 includes: a first screw hole 211, a first mounting slot 212, and a track 213, wherein the first screw hole 211 is disposed in correspondence to a second screw hole 222 on the knob lower case 22 and is configured to detachably connect the knob upper case 21 to the knob lower case 22, and the knob mechanism 24 is mounted in the first mounting slot 212. It should be particularly noted that the first mounting slot 212 may be diversified in terms of structure and form, as long as the mounting requirements of the knob mechanism 24 are satisfied. In this embodiment, the specific structure is not further described, and technical practice of the structure is a basic skill of a person skilled in the art. Further, it should be noted that the track 213 is a large slideway, which facilitates sliding of the rotation button and the entire structure.

In an optional technical solution according to the embodiment of the present disclosure, the knob lower case 22 further includes: a rotation protrusion 221 disposed on a lower surface of the knob lower case 22, wherein the number of the rotation protrusions 221 is equal to the number of the cup holder foot supports 3 and three rotation protrusions 221 are provided in this embodiment, and the rotation protrusions 221 acts on the slot 32 on the cup holder foot support 3 and is configured to control movement of the cup holder foot support 3. That is, when the knob mechanism 24 is rotated clockwise, the cup holder foot support 3 is gradually distracted; and when the knob mechanism 24 is rotated counterclockwise, the cup holder foot support 3 is gradually retracted.

In an optional technical solution according to the embodiment of the present disclosure, the knob cover plate 23 includes: a first serration 231 and a third screw hole 232, wherein the first serration 231 is disposed on an inner side wall of the knob cover plate 23, and the third screw hole 232 is configured to detachably connect the knob cover plate 23 to the cup holder housing 1. It may be understood that the knob cover plate 23 achieves a shielding and protection effect, the third screw hole 232 and the fourth screw hole 14 correspondingly disposed in the cup holder housing 1 are fastened by using bolts and nuts, and hence the knob cover plate 23 is detachably connected to the cup holder housing 1.

In an optional technical solution according to the embodiment of the present disclosure, the knob mechanism 24 includes: a rotation button 241, a spring 242, a gear 243, a rack 244, a second serration 245, and a mounting cavity 246, wherein the gear 243 is disposed in correspondence to the rack 244 and disposed at a middle portion of the knob mechanism 24, the number of the rotation buttons 241 is two and each of the two rotation buttons 241 is disposed on one side of the gear 243, the spring 242 is mounted inside the mounting cavity 246, one end of the spring 242 is in contact with a fascia 214 on the knob upper case 21, the other end of the spring 242 is in contact with the mounting cavity 246, the second serration 245 is disposed is disposed on each of two ends of the knob mechanism 24, the second serration 245 is disposed in correspondence to the first serration 231, and the second serration 245 is bi-directionally slidable on the track 213. With such configurations, referring to FIG. 5, in normal conditions, the spring 242 is relaxed, and when the rotation button 241 is pressed, a force is generated, and it is ensured that the rotation button 241 may not randomly slide along an axial direction when not being pressed. As seen from the specific action course, by rotation of the rotation button 241 and based on cooperation between the gear 243 and the rack 244, the knob mechanism 24 may be rotated, and hence the knob upper case and the knob lower case are driven to rotate, such that a relative position between the rotation protrusion 221 and the slot 32 on the cup holder support foot 3 is changed and movement of the cup holder support foot 3 is achieved. In the case that the rotation button 241 is pressed, the rotation button 241 may move inwards along the track 213, and hence the second serration 245 is driven to move inwards, such that the first serration is temporarily separated from the second serration. In addition, since the fascia 214 on the knob upper case is stationary, the spring 242 in the mounting cavity 246 may be compressed accordingly, and a retraction force is generated, thereby achieving a limiting effect. When the force appears, under the effect of the spring 242, the second serration 245 restores sliding on the track 213, and the first serration and the second serration maintain a contact and engagement state. Further, it should be noted that referring to FIG. 10, since a slop of the contact surface between the first serration and the second serration is mild (rotation from top to bottom in FIG. 10), during rotating the rotation button 241, a small force may cause keys on two sides of the rotation button to move inwards under the effect of a clamping tooth, or even the cup holder support foot 3 may be distracted even with no force applied. In the case that the rotation button is rotated to a next clamping tooth, since elasticity of the spring 242 may cause the keys on the two sides of the rotation button 241 to rotate outwards clockwise, the three cup holder support feet 3 are distracted. A contact angle between the first serration and the second serration in a counterclockwise retraction direction is approximately 90 degrees, and the two serrations may not be subject to relative movements and the cup holder support foot 3 may not be simply retracted. In this way, a locking function of the knob member 2 is implemented.

Additionally, it should be noted that according to the present disclosure, the rotation button 241 is disposed on a same axial line as the spring 242, the gear 243, the rack 244, and the second serration 245, and a button-like member disposed in the other vertical axial line achieves the effects of sealing and beautification (shielding the spiral hole structure).

In an optional technical solution according to the embodiment of the present disclosure, a first rubber structure 5 is disposed at an upper end portion of the cup holder housing 1, a second rubber structure 6 is disposed on an outer side surface of the cup holder foot support 3, and a cup pad 4 is disposed at an upper portion of the knob member 2 inside the cup holder housing 1. The first rubber structure 5 is designed to be adaptive to the size of the cup, and the second rubber structure 6 is designed to have specifications adaptive to the specifications of the cup holder support foot 3. The two rubbers are both achieve a buffering effect, and both pertain to the related arts, which are not specifically limited in the present disclosure.

Further, an embodiment of the present disclosure further provides a combined in-vehicle implement. The implement includes: the in-vehicle cup holder as described above, a secondary cup holder 7, and a tray 8, wherein the secondary cup holder 7 is movably mounted on a side wall of in-vehicle the cup holder, and the tray 8 is movably connected to the secondary cup holder 7. The above structures all pertain to the related arts, which are not specifically limited and protected in the present disclosure.

Mounting and use principles of the in-vehicle cup holder according to the present disclosure are as follows: The in-vehicle cup holder according to the present disclosure is firstly placed into a cup frame in a vehicle, the cup pad 4 is removed, and the rotation button 241 is rotated clockwise, and the three cup holder support feet 3 are gradually distracted; and in the case that the cup holder support feet 3 are totally distracted, the cup pad 4 is mounted again, and then the secondary cup holder 7 and the tray 8 are mounted. When the rotation button 241 is held and rotated clockwise, since a relative force (a contact angle) between the first serration 231 and the second serration 245 is small, the knob mechanism 24 may be rotated by pressing or event not pressing the rotation button 241 (during pressing, the spring 242 is compressed, the first serration and the second serration are separated from each, and the force therebetween substantially disappears), and hence the rotation protrusion 221 is driven. The rotation protrusion 221 acts on the slot 32, such that the cup holder support foot 3 is driven to be gradually distracted from the inside of the first housing section 11. When the cup holder support foot 3 is totally distracted, the in-vehicle cup holder is fixed.

When the in-vehicle cup holder needs to be removed, firstly, the cup pad 4 is removed and then the rotation button 241 is pressed on and counterclockwise rotated, and in this case, the cup holder support foot 3 is slowly retracted. When the cup holder support foot 3 is totally retracted, the cup pad 4 is mounted, and in this case, the cup holder is removed.

In addition, due to a particular structural form between the first serration 231 and the second serration 245, clockwise movement is simply achieved and the cup holder support foot is easily distracted. However, in the case of counterclockwise movement (retraction), the contact angle is large, such that the automatic retraction is not easily achieved. This prevents looseness of the cup holder after use. Furthermore, since the knob member 2 according to the present disclosure is disposed at the bottom of the cup holder, and the housing is integrally designed, by rotating the knob inside the housing, the orientation of the notch 15 may be determined first, which facilitates take-off of the cup. Then, the knob inside is rotated and fastened, which greatly facilitates take-off of the cup.

The above embodiments are merely given for illustration of the technical concepts and characteristics of the present disclosure, and are intended to better help persons skilled in the art to understand the content of the present disclosure and practice the technical solutions according to the present disclosure. However, these embodiments are not intended to limit the protection scope of the present disclosure. Any equivalent variations or modifications derived without departing from the spirit and essence of the present disclosure shall be considered as falling within the protection scope of the present disclosure.

What is claimed is:

1. An in-vehicle cup holder, comprising: a cup holder housing, the cup holder housing being provided therein a cup holder foot support and a knob member; wherein the knob member is disposed above the cup holder foot support, and the cup holder foot support is extended and retracted under an effect of the knob member;

the knob member comprises: a knob lower case, a knob upper case disposed on the knob lower case, a knob cover plate, and a knob mechanism, wherein the knob mechanism is mounted on the knob upper case, and the knob cover plate is mounted on an inner side wall of the cup holder housing and is in contact with the knob mechanism;

the knob upper case comprises: a first screw hole, a first mounting slot, and a track, wherein the first screw hole is disposed in correspondence to a second screw hole on the knob lower case and is configured to connect the knob upper case to the knob lower case, and the knob mechanism is mounted in the first mounting slot;

the knob cover plate comprises: a first serration and a third screw hole, wherein the first serration is disposed on an inner side wall of the knob cover plate, and the third screw hole is disposed in correspondence to a fourth screw hole on the cup housing; and the knob mechanism comprises: two rotation button, a spring, a gear, a rack, a second serration, and a mounting cavity, wherein the gear is disposed in correspondence to the rack and disposed at a middle portion of the knob mechanism, each of the two rotation buttons is disposed on one side of the gear, the spring is mounted inside the mounting cavity, one end of the spring is in contact with a fascia on the knob upper case, the other end of the spring is in contact with the mounting cavity, the second serration is disposed on each of two ends of the knob mechanism, the second serration is disposed in correspondence to the first serration, and the second serration is bi-directionally slidable on the track.

2. The in-vehicle cup holder according to claim 1, wherein the cup holder housing is a hollow cylinder, and is composed of a first housing section, a second housing section, and a third housing section that become progressively larger.

3. The in-vehicle cup holder according to claim 2, wherein the cup holder foot support is disposed inside the first housing section, the first housing section is provided with a cavity structure allowing extension and retraction of the cup holder foot support, and the knob member is disposed inside the second housing section.

4. The in-vehicle cup holder according to claim 3, wherein a slide is disposed inside the first housing section, a slideway corresponding to the slide is disposed on each of both sides of the cup holder foot support, and an annularly distributed slot is disposed in an upper surface of the cup holder foot support.

5. The in-vehicle cup holder according to claim 4, wherein the knob lower case further comprises: a rotation protrusion disposed on a lower surface of the knob lower case, wherein the number of the rotation protrusions is equal to the number of the cup holder foot supports, and the rotation protrusions acts on the slot on the cup holder foot support and is configured to control movement of the cup holder foot support.

6. The in-vehicle cup holder according to claim 1, wherein a first rubber structure is disposed at an upper end portion of the cup holder housing, a second rubber structure is disposed on an outer side surface of the cup holder foot support, and a cup pad is disposed at an upper portion of the knob member inside the cup holder housing.

7. A combined in-vehicle implement, comprising: the in-vehicle cup holder as defined in claim 1, a secondary cup holder, and a tray, wherein the secondary cup holder is movably mounted on a side wall of in-vehicle the cup holder, and the tray is movably connected to the secondary cup holder.

* * * * *